May 28, 1935.   F. S. BARKS ET AL   2,003,032
LUBRICATING APPARATUS
Filed May 18, 1934
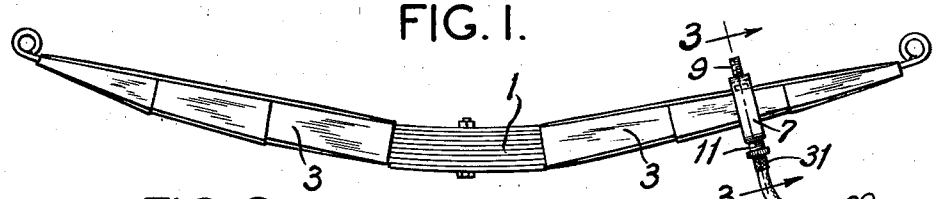
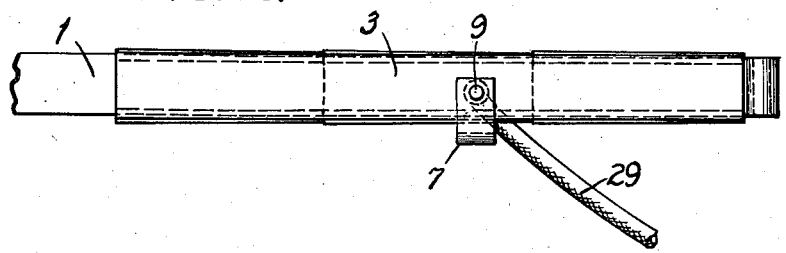
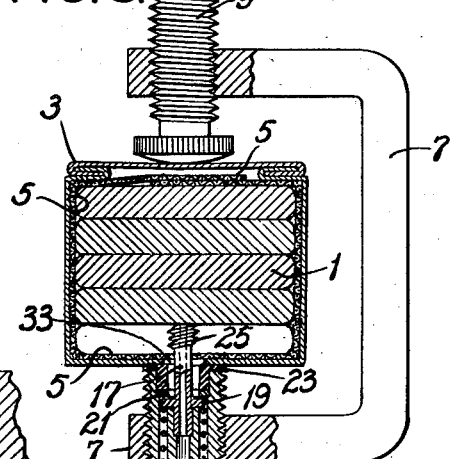
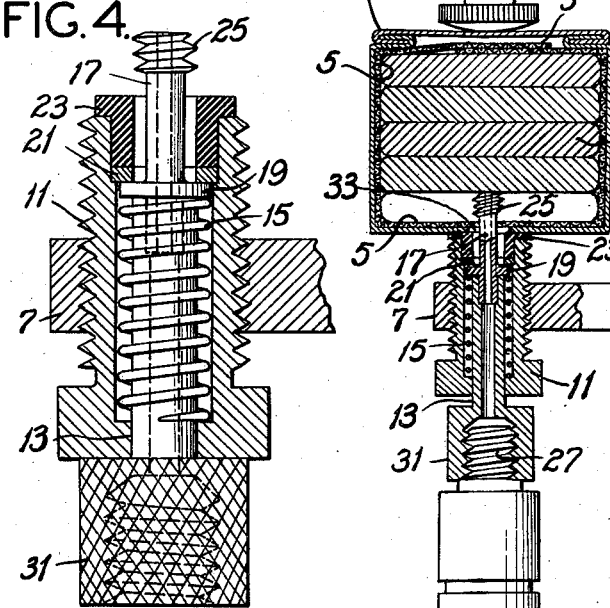
Frank S. Barks,
Alexander P. Fox,
Inventors.
Delos G. Haynes,
Attorney.

Patented May 28, 1935

2,003,032

UNITED STATES PATENT OFFICE 2,003,032

LUBRICATING APPARATUS

Frank S. Barks, St. Louis, and Alexander P. Fox, University City, Mo., assignors to Lincoln Engineering Company, St. Louis, Mo., a corporation of Missouri Application May 18, 1934, Serial No. 726,318

3 Claims. (Cl. 184—105)

This invention relates to lubricating apparatus and with regard to certain more specific features, to apparatus of this class for lubricating springs and the like.

Among the several objects of the invention may be noted the provision of an improved form of lubricating clamp for injecting lubricant into the metal covers now provided for leaf springs in such a manner that the lubricant is positively introduced within the fabric liner used within these covers; and the provision of apparatus of a class which is as effective after a plurality of operations as upon the first operation. Other objects will be in part obvious and in part pointed out hereinafter.

The invention accordingly comprises the elements and combinations of elements, and features of composition, which will be exemplified in the products hereinafter described, and the scope of the application of which will be indicated in the following claims.

In the accompanying drawing, in which is illustrated one of various possible embodiments of the invention, Fig. 1 is a side elevation of a spring illustrating the use of the invention;

Fig. 2 is a plan view of the right-hand portion of Fig. 1;

Fig. 3 is an enlarged vertical section taken on line 3—3 of Fig. 1; and,

Fig. 4 is an enlarged detail view of the lower portions of Fig. 3.

Similar reference characters indicate corresponding parts throughout the several views of the drawing.

Referring now more particularly to Fig. 1, there is shown at numeral 1 a laminated leaf spring having metallic covers 3 for excluding dirt and holding lubricant. These covers 3 are provided with a fabric liner 5 (Fig. 3) which is ordinarily composed of canvas or the like. The covers retain the lubricant and the liners 5 function as containers and wicks for lubricant with which the covers are preferably initially filled. The present invention refers to a tool for either replenishing the lubricant supply within the covers, or initially providing it.

The device comprises a C-shaped clamp 7 having an adjustable buttress screw 9 and an oppositely located clamp screw 11, the latter being hollow and containing a slidable inlet tube 13.

The tube 13 is pressed toward the spring 1 by means of a coil spring 15 and is also provided with an outlet nozzle 17. Outward motion of the nozzle 17 is limited by engagement of a shoulder 19 thereon with a washer 21, the latter being tight in the screw 11. Above the washer 21 and flanged down over the end of the clamp screw 11 is a rubber gasket 23 which seals the clamp screw 11 against the covers 3, as will be explained.

The outlet 17 is provided with a threaded end 25. The inlet end of the member 13 is provided with a suitable connection 27 for a lead-in hose 29, to the other end of which is connected a suitable lubricant compressor. It is to be understood that the connection at 27 may be made detachable if desired.

The outer end of the member 13 is provided with a knurled head 31 whereby the same may be grasped and retraction effected.

Operation of the apparatus is as follows:

A hole 33, either having been previously provided or provided when it is desired to use this apparatus upon a cover 3, has applied thereto the screw-fitted outlet 25. This is done by first applying the buttress screw 9 above the cover 3 and by means of the knurled head 31 retracting the head 25 into the confines of the gasket 23. The operator then releases the head 31 and rotates it clockwise so as to screw through the canvas liner 5. After the head 25 is screwed through the canvas 5, the coil spring 15 by moving the nozzle 17 toward the automobile spring assures that the outer end of said head will contact with the closest leaf of the spring 1. Then when lubricant is introduced through the line 29, the same passes through the member 13 and out of the nozzle 17 to a position positively within the fabric liner 5, from whence it spreads within the confines of canvas 5 surrounded by the cover 3, thereby spreading to all surfaces of the spring 1.

In another type of this apparatus the hub 25 is normally forced in the outward direction, the theory being that thereby a liner 5 is lifted away from the spring and the lubricant introduced therein. However, this construction is not effective, inasmuch as a tearing of the canvas occurs after several introductions of the head 25 and thereafter it cannot be retracted by means of outward motion of the said head 25.

With this invention, even though the canvas tears by introducing the head 25, each subsequent application of the head will assure that lubricant will be delivered within the canvas, because the head 25 is always forced into cooperation with the spring 1. Thus the present apparatus is operable each and every time it is put into use.

After enough lubricant has been introduced, the clamping screw 11 is backed out, and the head 25 withdrawn by pulling down on the head 31.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. In a lubricating clamp for spring covers and the like, a clamp screw adapted to be sealed about an opening in a cover, a reciprocating member passing through the clamp screw and having an opening therethrough and means for normally pressing said member through said opening and toward contact with said spring.

2. In a lubricating clamp for spring covers and the like, a clamp screw adapted to be sealed about an opening in a cover, a reciprocating member passing through the clamp screw and having an opening therethrough and means for normally pressing said member through said opening and toward contact with said spring, said last-named means comprising a spring held within a socket in the clamp screw and reacting against the reciprocating member.

3. In a lubricating clamp for spring covers and the like, a clamp screw adapted to be sealed about an opening in a cover, a hollow reciprocating member passing through the clamp screw and having a threaded outlet adapted to enter said opening, a socket in said clamp screw surrounding the reciprocating member, and a spring in said socket and reacting upon said member to normally press the same outwardly from the clamp screw and into said opening, and exterior means for effecting retraction of said outlet into the confines of the clamp screw.

FRANK S. BARKS.
ALEXANDER P. FOX.